United States Patent Office 3,055,875
Patented Sept. 25, 1962

3,055,875
MODIFIED ETHYLENE POLYMERS
Richard A. Walther, St. Albans, W. Va., assignor to Union Carbide Corporation, a corporation of New York
No Drawing. Filed July 5, 1960, Ser. No. 40,523
5 Claims. (Cl. 260—85.3)

This invention relates to modified ethylene polymers having improved physical properties. More particularly, this invention relates to modified ethylene polymers prepared by polymerizing ethylene in the presence of trace amounts of 1,3-butadiene.

Conventional polyethylene has a rather high coefficient of friction. As a result, films cast therefrom are characterized by rather poor slip properties, and the use of such films in automatic fabricating equipment presents somewhat of a problem inasmuch as their high coefficients of friction tend to make automatic slitting, sealing and packaging difficult.

The incorporation of a lubricant, such as a high molecular weight oil, into polyethylene resins has been suggested as a means of reducing their coefficients of friction. However, such procedures can cause films cast from such resins to have an oily feel. Furthermore, the lubricants employed for such purpose tend to diffuse into articles which come into contact with the films. This is particularly disadvantageous when such films are employed in wrapping articles such as food where contamination is to be avoided.

It has now been discovered that the coefficient of friction of polyethylene can be lowered in excess of 40 percent, and that the film impact strength can be increased, without significantly lowering conversion, by polymerizing ethylene in the presence of 1,3-butadiene in an amount of from about 10 p.p.m. to about 300 p.p.m. by volume, preferably from 40 p.p.m. to 200 p.p.pm., of said butadiene based on the amount of ethylene employed. The amount of butadiene employed is critical, and if amounts outside the limits of the broadly disclosed range are employed, the advantages disclosed herein are not obtained. It is noteworthy that the use of such critical amounts of butadiene has no significant detrimental effect on the other physical properties of such polymers, such as, for example, density, stiffness, yield point, tensile strength, elongation, and dielectric strength, and in many instances improves such properties.

It has also been discovered that the molecule weight of polyethylene can be substantially increased, as indicated by a decrease in melt index of up to ten-fold or more, by polymerizing ethylene, at any given concentration of catalyst, in the presence of the critical amounts of butadiene specified above. Thus, the molecular weight of butadiene-modified polyethylene produced in accordance with the process of the instant invention is substantially higher than the molecular weight of polyethylene produced in the same manner but in the absence of butadiene. Since the molecular weight of such polymers decreases with increasing catalyst concentrations, and since the conversion rate increases with increasing catalyst concentrations, it is also possible to employ increased concentrations of catalyst with the ethylene and butadiene to obtain polymers having molecular weights as low as those obtained when ethylene is polymerized in the absence of butadiene, while at the same time maintaining as high a conversion rate as is attained in the absence of butadiene. By carefully proportioning the amount of catalyst and butadiene present during polymerization, it is possible to obtain polymers of any desired molecular weight.

The butadiene-modified ethylene polymers of the instant invention can be prepared by polymerizing ethylene in the presence of the critical amounts of butadiene specified above and a free radical catalyst at a pressure of from about 14,000 p.s.i. to about 100,000 p.s.i., preferably from about 18,000 p.s.i. to about 50,000 p.s.i., and at a temperature of from about 140° C. to about 300° C., preferably from about 160° C. to about 250° C.

Polymerization according to the process of the instant invention is promoted by a free radical catalyst, including, for example, oxygen, peroxides, percarbonates, peresters and azo compounds. Among the peroxides which can be employed as catalysts may be mentioned hydrogen peroxide, sodium peroxide, barium peroxide, magnesium peroxide, diethyl peroxide, dibenzoyl peroxide, distearyl peroxide, di-tertiary-butyl peroxide, di-tertiary-butyl hydroperoxide, diacetyl peroxide, distearoyl peroxide and acetyl benzoyl peroxide. Specific examples of the azo compounds which can be employed include $\alpha,\alpha'$-azo-bis-isobutyronitrile and 2,2'-dicyanoazobenzene. Illustrative of the percarbonates which can be employed are diisopropyl percarbonate and di-tertiary-butyl percarbonate, while a typical perester would be acetaldehyde monoperacetate.

The preferred free radical catalyst employed in the process of the instant invention is oxygen. When oxygen is employed as catalyst, it should be employed in an amount of from about 10 p.p.m. to about 1000 p.p.m. by volume, preferably from about 20 p.p.m. to about 500 p.p.m., based on the amount of ethylene employed. When a catalyst other than oxygen is employed, conventional amounts, well known in the art, are employed.

While the process of the instant invention is preferably conducted continuously in a tubular reactor, it can also be conducted in a semi-continuous or batchwise manner. In addition to butadiene, other modifiers may be present during polymerization, including, for example, chain transfer agents such as secondary butanol, acetone, acetaldehyde and the like.

The polymers produced in accordance with the instant invention can be employed in the many uses commonly made of polyethylene resins, such as in the production of films, coatings, molded articles and the like. They are especially suitable for use in films because of their low coefficient of friction. When such polymers are to be employed for this purpose, however, care should be exercised in selecting the amount of butadiene and catalyst to be employed in the polymerization, in order to produce a polymer of molecular weight suitable for film extrusion. When polymers of very high molecular weight are produced, they are especially suitable for pipe and cable jacketing.

Unless otherwise specified, all parts and percentages, as used throughout this specification, are by weight. All p.s.i. measurements are expressed in absolute values.

The following examples are set forth for purposes of illustration so that those skilled in the art may better understand this invention, and it should be understood that they are not to be construed as limiting this invention in any manner. The testing techniques employed in evaluating the polymers prepared in accordance with said examples are set forth below.

DENSITY

Determined in accordance with the procedure described by Hunter and Oaks, Trans. Faraday Soc., 41, 49 (1945). The polymer is molded into a plaque of 0.070 inch thickness by compression at a temperature of 170° C. and then cooled under pressure in a press by running cold water through the platens. The plaque is then annealed in an oven for 48 hours at a temperature of 60° C., and the density of the plaque is determined by flotation in a liquid at 25° C.

STIFFNESS

The secant modulus of elasticity of a polymer as measured by an Instron tester. This tester is manufactured by the Instron Engineering Company of Quincy, Mass. (Model TTB). The stiffness modulus is calculated by multiplying by 100 the force in pounds per square inch necessary to stretch a sample of the polymer having a cross sectional area of one square inch one percent of its original length at a rate of one percent per minute.

MELT INDEX

The rate at which a polymer is extruded through a die having a diameter of 0.0825 inch in accordance with the procedure in ASTM test procedure D–1238–52T. This property is expressed in decigrams per minute, and is determined by placing a ten gram sample in a tube having a diameter of 3/8 of an inch, and applying a load of 2160 grams, at a temperature of 190° C., to a plunger which forces the melted polymer through a die having a diameter of 0.0825 inch. Polymers of high molecular weight extrude more slowly and therefore have a lower melt index.

IMPACT STRENGTH

Determined in accordance with the falling ball impact test which consists in determining the height in feet at which a MacGregor official 100 NB Nightball, released without twisting or forward motion, will rupture a film of polymer mounted on the open end of a cylinder by means of a spring band so that it is taut and wrinkle-free, but not stretched.

COEFFICIENT OF FRICTION

Determined in accordance with the moving sled stationary film method described in ASTM Committee, D20 sub X–I–X, Proposed tentative method, B/NPCC, February 17, 1958. A 16-inch by 18-inch sample of film is taped smoothly to the surface of a level plane with care being taken to remove all wrinkles without causing any elongation of the film. A smaller specimen of the film is attached to a sled weighing one kilogram which consists of a steel block 7/8" x 2 3/8" x 4" mounted on a rubber base. The sled is attached to a synchronous motor by means of a tow line with the tow line passing through a gage which in turn is connected to a microammeter in which the microammeter scale has been replaced with a coefficient of friction scale reading from 0 to 1, with 1 corresponding to a full-scale reading of the meter (30 microamperes). The film-covered sled is placed on the level plane and pulled by the motor in the machine direction of the film. The coefficient of friction is read directly from the scale after the sled has traveled 1, 2 and 3 inches, and the average of these three values is taken. The test is then repeated with another two small specimens of the film on the sled, and the average taken for the three test specimens is reported as the coefficient of friction.

Example I

A mixture of ethylene and oxygen, containing about 170 parts per million by volume of oxygen, based on the volume of ethylene, was compressed to a pressure of about 32,500 p.s.i. The mixture was passed through a jacketed tubular reactor about 60 feet long and 3/16 of an inch in inside diameter, at a rate of about 28 pounds per hour, while the jacket temperature was maintained at 185° C. and the reactor pressure was maintained at about 32,500 p.s.i. Liquid polymer and unreacted gases were discharged from the reactor through a suitable control valve, and sprayed with water. The polymer was recovered in a separating vessel. The conversion was about 23.5 percent of theoretical. The polyethylene had a melt index of 0.75 decigram per minute, a density of 0.918 gram/ml., and a stiffness of 19,000 p.s.i at 25° C. When the polymer was extruded to a film of 1.5 mil thickness, the coefficient of friction of the film was 0.5 and its impact strength was 2.0 feet.

Example II

The procedure described in Example I was repeated except that about 100 parts per million by volume of butadiene, based on the volume of ethylene, was added to the mixture of ethylene and oxygen at a pressure of about 5 p.s.i. while said mixture was being compressed. The conversion to polymer was about 21.6 percent of theoretical. The butadiene-modified polyethylene had a melt index of 0.007 decigram per minute, a density of 0.921 gram/ml., and a stiffness of 20,000 p.s.i. at 25° C.

Example III

The procedure described in Example II was repeated employing 235 parts per million by volume of oxygen, based on the volume of ethylene. The conversion to polymer was about 23.1 percent of theoretical. The butadiene-modified polyethylene had a melt index of 0.85 decigram per minute, a density of 0.919 gram/ml., and a stiffness of 20,000 p.s.i. at 25° C. The polymer was extruded to a film of 4 mil thickness having a coefficient of friction of 0.2 and an impact strength of 4.0 feet.

Example IV

The procedure described in Example I was repeated except that 40 parts per million by volume of butadiene, based on the volume of ethylene, was added to the mixture of ethylene and oxygen at a pressure of about 5 p.s.i. while said mixture was being compressed. The conversion to polymer was about 23.2 percent of theretical. The butadiene-modified ethylene had a melt index of 0.26 decigram per minute, a density of 0.919 gram/ml., and a stiffness of 19,000 p.s.i. at 25° C.

Example V

The procedure described in Example I was repeated except that 150 parts per million by volume of butadiene, based on the volume of ethylene, was added to the mixture of ethylene and oxygen at a pressure of about 5 p.s.i. while said mixture was being compressed. The conversion to polymer was about 19.5 percent of theoretical. The butadiene-modified polyethylene had a melt index of 0.002 decigram per minute, a density of 0.924 gram/ml., and a stiffness of 24,000 p.s.i. at 25° C.

Example VI

The procedure described in Example I was repeated employing 387 parts per million by volume of oxygen, based on the volume of ethylene, and adding 485 parts per million by volume of butadiene, based on the volume of ethylene, to the mixture of ethylene and oxygen at a pressure of about 5 p.s.i. while said mixture was being compressed. The conversion to polymer was about 13 percent of theoretical. The butadiene-modified polymer had a melt index of 0.23 decigram per minute and a density of 0.916 gram/ml. The polymer was extruded to a film of 1.5 ml. thickness having a coefficient of friction of 0.15.

Example VIII

The procedure described in Example I was repeated employing 33.5 parts per million of oxygen, based on the volume of ethylene, and adding 1000 parts per million by volume of butadiene, based on the volume of ethylene, to the mixture of ethylene and oxygen at a pressure of about 5 p.s.i. while said mixture was being compressed, and employing a jacket temperature of 250° C. The conversion to polymer was about 6.25 percent of theoretical. The butadiene-modified polymer had a melt index of 0.3 decigram per minute and a density of 0.917 gram/ml.

Examples VI and VII serve to illustrate how the conversion of ethylene decreases when amounts of butadiene outside the limits of the critically disclosed range are employed.

What is claimed is:

1. A process for producing butadiene-modified ethylene polymers which comprises heating ethylene in the presence of a free radical catalyst and 1,3-butadiene in an amount of from 10 p.p.m. to 300 p.p.m. by volume of said butadiene based on the amount of ethylene present at a temperature of from about 140° C. to about 300° C. and at a pressure of from about 14,000 p.s.i. to about 100 p.s.i.

2. A process as in claim 1 wherein the 1,3-butadiene is present in an amount of from 40 p.p.m. to 200 p.p.m. by volume based on the amount of ethylene present.

3. A process as in claim 1 wherein the reaction is conducted continuously in a tubular reactor.

4. A process as in claim 2 wherein the reaction is conducted continuously in a tubular reactor.

5. Butadiene-modified ethylene polymers produced by heating ethylene in the presence of a free radical catalyst and 1,3-butadiene in an amount of from 10 p.p.m. to 300 p.p.m. by volume of said butadiene based on the amount of ethylene present at a temperature of from about 140° C. to about 300° C. at a pressure of from about 14,000 p.s.i. to about 100,000 p.s.i.

References Cited in the file of this patent
UNITED STATES PATENTS 2,938,515    Davison  ---------------- June 17, 1958

UNITED STATES PATENT OFFICE
CERTIFICATE OF CORRECTION

Patent No. 3,055,875                           September 25, 1962.

Richard A. Walther

It is hereby certified that error appears in the above numbered patent requiring correction and that the said Letters Patent should read as corrected below.

Column 5, line 11, for "100 p.s.i." read -- 100,000 p.s.i. --; column 6, line 8, after "300° C." insert -- and --.

Signed and sealed this 19th day of March 1963.

(SEAL)
Attest:

ESTON G. JOHNSON
Attesting Officer

DAVID L. LADD
Commissioner of Patents